Aug. 16, 1955    M. F. CHUBB ET AL    2,715,652
ELECTRIC BATTERY FOR AIRBORNE EQUIPMENT
Filed Jan. 16, 1952

INVENTORS.
Melvin F. Chubb.
BY James M. Hines.
Wood, Herron & Evans.
ATTORNEYS.

United States Patent Office 2,715,652
Patented Aug. 16, 1955

2,715,652

ELECTRIC BATTERY FOR AIRBORNE EQUIPMENT

Melvin F. Chubb and James M. Dines, Joplin, Mo., assignors to The Eagle-Picher Company, Cincinnati, Ohio, a corporation of Ohio Application January 16, 1952, Serial No. 266,736

2 Claims. (Cl. 136—100)

This invention relates to primary batteries in which the positive electrode is constituted by a semi-porous mass of cuprous chloride pasted to a grid or screen mesh. This type of positive electrode is characterized by the limitation that it disintegrates readily physically when exposed to moisture, a damp atmosphere or an aqueous electrolyte, but it has the advantage that it provides a very substantial total quantity of electric power in relation to the weight of the cuprous chloride, provided complete discharge immediately follows activation of the battery by introduction of the electrolyte. Cuprous chloride batteries utilize water with or without an ionizing salt in solution therein as an electrolyte; the cuprous chloride both absorbs the water and dissolves slowly therein—the rate of dissolution depending upon both the quantity of electrolyte employed and the physical composition of the cuprous chloride electrode.

In co-pending application, Serial No. 172,558, filed July 7, 1950, entitled "Electric Battery," now Patent No. 2,684,395, dated July 20, 1954, there is disclosed and claimed a cuprous chloride type of battery wherein the positive electrode is constituted by a mass of powdered cuprous chloride pasted to a screen mesh plate and set thereon with plastic. In this type of battery the electrolyte (water with or without an ionizing salt) is absorbed by a bibulous pad or membrane which is held in physical engagement with the cuprous chloride. Thus, the cuprous chloride is not immersed in a body of liquid electrolyte and tends to dissolve or disintegrate physically at a slower rate than it would if immersed in and fully exposed to a large volume of electrolyte. A battery of this type may discharge over a period of several hours at a rate which is quite high in relation to the total weight of the battery, for instance in comparison with the performance of a lead acid battery. This favorable electrical capacity to weight ratio make a cuprous chloride battery highly suitable for use in airborne equipment and for other purposes where the weight factor is of primary importance.

In said identified co-pending application and in co-pending application, Serial No. 181,248, filed August 24, 1950, entitled "Method of Making Electric Batteries," now Patent No. 2,684,481, dated July 20, 1954, a cuprous chloride battery in which magnesium negative plates are employed is disclosed. The use of magnesium as the active chemical of the negative electrode has the advantage of generating current at a high voltage but the disadvantage of heating the battery to such a degree that the limited supply of available electrolyte is boiled off before the chemicals of the electrodes have been entirely consumed.

The object of the present invention is to provide a battery having cuprous chloride positive electrodes which discharges to the exhaustion of the chemicals which constitute the electrodes even when a limited quantity of electrolyte, such as may be held on a bibulous pad, is utilized for activating the cells.

Our improved cuprous chloride battery involves substitution of zinc negative electrodes for the magnesium negative electrodes, in whole or in part. While zinc electrodes normally provide only about half of the open circuit voltage of magnesium electrodes, this disadvantage is offset in part by the circumstance that the cuprous chloride zinc cells discharge without evolution of any appreciable quantities of heat. Thus, with the zinc negatives, the chemicals which constitute the electrodes may be exhausted by a limited quantity of electrolyte without loss of electrolyte by evaporation from overheating.

We have further discovered that better results are had if porous zinc negatives are used instead of plain zinc sheets, pasted zinc electrodes, for instance. If the rate of discharge is slow, then the plain zinc sheets are satisfactory for the negative electrodes, but if the discharge rate is high, polarization tends to occur. We have found that pasted or electroplated zinc electrodes are better than zinc sheets in this regard. Further, we have discovered that the voltage differential between the cuprous chloride and zinc electrodes may be increased and the polarizing tendency decreased by amalgamating the zinc electrodes with mercury. Thus, cuprous chloride zinc batteries may be built in accordance with the structure generally disclosed in the identified co-pending applications, which batteries approximate in performance the cuprous chloride magnesium batteries disclosed therein, but have the added advantage of delivering current to exhaustion of the electrode chemicals.

For airborne equipment, however, the cuprous chloride zinc cell has a disadvantage in comparison with the cuprous chloride magnesium cell, namely, it does not operate efficiently at the low temperatures which are incident to great altitudes. Also, under low temperature conditions such as those which may prevail in airborne equipment, the electrolyte of the zinc cells may freeze.

On the other hand, the cuprous chloride magnesium cells heat up during discharge so that even at very low temperatures the internal cells of a battery overheat and evaporate electrolyte so that the cells fail before the electrode chemicals are exhausted. A further development of our invention comprises combining cuprous chloride zinc and cuprous chloride magnesium cells into a single battery, whereby the cuprous chloride magnesium cells warm the cuprous chloride zinc cells to an efficient operating temperature, and the cuprous chloride zinc cells, by absorbing heat from the cuprous chloride magnesium cells, prevent overheating of the latter. By proper combination of these cells in a single battery, it is possible to build a battery which operates efficiently and effectively over a temperature range of from minus 40 to plus 160° F. Such a battery is highly suitable for use in airborne equipment such as weather observation balloons and the like. The battery may be used merely for energizing an incandescent electric light, if the balloon is for the observation of wind conditions, or the battery may be used for operating a radio transmitting device or for performing mechanical operations affecting the flight of the airborne equipment itself. In any case, the battery is constructed physically as a unit, stored in a dry place, then activated with electrolyte (water) immediately prior to use.

Other objectives and further advantages will be disclosed in relation to a description of the accompanying drawings in which.

The battery disclosed in these views is put together physically in a manner slightly different from the batteries disclosed in the previously identified co-pending applications. The batteries of those applications comprise a stack of flat waferlike cells connected in series and held together by a thermally set plastic adhered to opposite side edges of the electrode stack. In said applications, copper sheets are used between the positive and negative plates of adjacent cells to prevent electrolyte from getting between the two cells and generating a counter-electromotive force. If desired, this type of construction may be used for the batteries of the present invention.

In practice, however, it has been determined that there is apt to be leakage of electrolyte between the copper sheeting and the plastic cement which was used for sealing the edges of the cells. As a matter of degree, the amount of short circuiting was not particularly significant if the battery were discharged at a relatively high rate, but tended to impair efficiency if the battery were discharged at a medium or low rate. The batteries of the present invention preferably utilize a cell and battery construction disclosed in our co-pending application, Serial No. 311,687, filed September 26, 1952, entitled "Method of Constructing Batteries." This method of construction involves the use of plastic cell partitions and end plates to which plastic cement, which seals opposite side edges of the battery, bonds effectively to prevent leakage of electrolyte or current from cell to cell.

Figure 2:
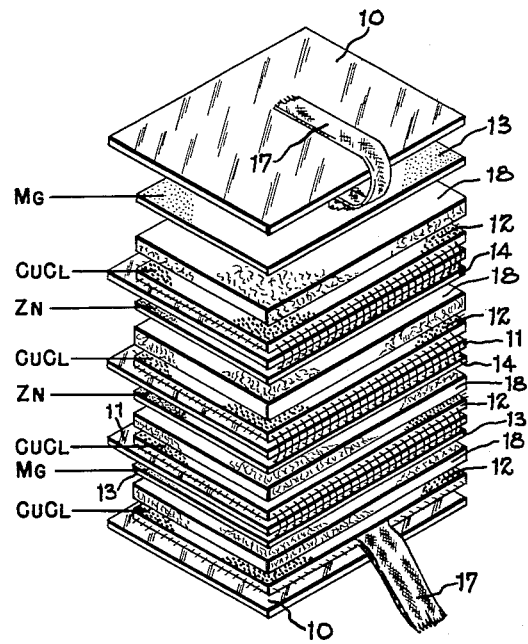
Figure 2 is an exploded view of the cells of the battery of Figure 1.

More particularly, as disclosed in Figure 2, two end plates 10 and three cell partitions 11 are utilized, all constituted by thin flexible sheet plastic material and all of substantially the same size and shape. These plastic sheets or plates are utilized to define a series of four cells. The same construction may be used for larger batteries, that is, the number of cells may be multiplied to any desired extent.

Over each partition two electrodes are attached, a cuprous chloride positive electrode 12 and a negative electrode. As disclosed, magnesium negative electrodes 13 are used in the two end cells and pasted zinc electrodes 14 are used in the two inner cells. The electrodes on each side of a cell partition are connected by a weld 15 which connects the screen 16 on which the active electrode materials are pasted to the negative one of the two electrodes. Alternatively, a metal connecting strip may be employed and cemented to the cell partitions. Appropriate positive and negative electrodes are also secured to the inner face of each end plate by terminal connectors 17 which are cemented thereto. Bibulous pads or other bibulous material 18 are disposed between the positive and negative electrodes of each cell.

Figure 3:
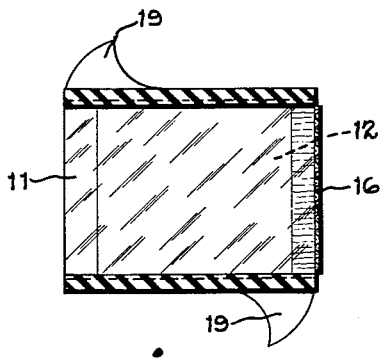
Figure 3 is a cross sectional view on line 3—3 of Figure 1.
Figure 4:
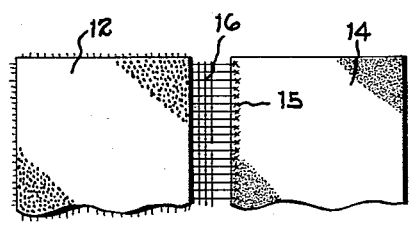
Figure 4 is a fragmentary plan view showing the preferred method of fastening together the negative and positive plates.

As disclosed in Figure 3, the electrodes are of about the same width as the cell partitions and end plates, but are not quite as high, and the bibulous pads are substantially the same size as the electrodes. Thus, on the sides of the battery, the end plates, the cell partitions, the electrodes and bibulous pads are substantially flush edgewise, but the end plates and cell partitions project beyond the electrodes and bibulous pads top and bottom (the top being to the front in Figure 1). All of these elements are assembled together in a stack under compression after which the substantially flush side edges are sealed with a plastic cement which bonds to the cell partitions and end plates. This plastic cement is then thermally set so that it holds all of the elements of the stack together under compression and eliminates the necessity for the conventional battery case.

The stack is open top and bottom, as disclosed, and may be activated by immersion or dunking in water, which may, if desired, contain an ionizing salt and/or a wetting agent. If desired, the top and bottom of the battery may also be enclosed by plastic cement, the same as the sides, provided of course that appropriate means is provided for introducing electrolyte into all of the cells. Primarily, the battery is intended to be activated simply by being dipped in water, then the excess water shaken out, but the activation may be accomplished in any other convenient manner.

Any desired system of plastics may be employed for the end plates, the cell partitions and the thermally set plastic cement, provided the plastic cement and end plates and cell partitions constitute a compatible system of plastics in that the cement bonds to the plastic sheets and plates with tenacity requisite to prevent leakage of electrolyte or current, and provided the plastic materials after being thermally set are sufficiently strong physically to hold the elements together so that there is compression between the bibulous pads which serve as electrode separators and the electrodes themselves.

Preferably, we fabricate the end plates and cell partitions from sheet plastic materials such as the vinyl plastics, i. e., vinyl acetate and chloride copolymers, chlorinated rubbers and/or a methyl methacrylate type of material. As a plastic cement, we use a copolymer of vinyl chloride and vinyl acetate which is adapted to be thermally set and which is plasticized preferably with a solvent type plasticizer, such as dibutyl phthalate, which plastic cement after being thermally set forms a heavy flexible gumlike mass which adheres to the end plates and cell partitions and binds them together. Any other desired system of compatible plastics may be used in place of the materials specified.

Figure 1:
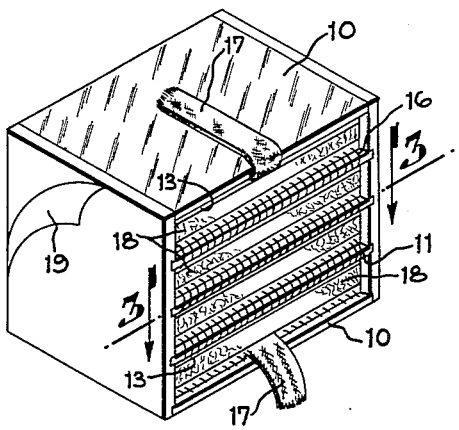
Figure 1 is a perspective view of a small battery which contains two external cuprous chloride magnesium cells and two internal cuprous chloride zinc cells.

Alternatively, the materials and methods which are disclosed in co-pending applications, Serial No. 172,558, filed July 7, 1950, entitled "Electric Battery," now Patent No. 2,684,395 and Serial No. 181,248, filed August 24, 1950, entitled "Method of Making Electric Batteries," now Patent No. 2,684,481, may be used in place of those herein disclosed, although it is believed that the insulation from cell to cell is more perfectly achieved by the preferred construction disclosed herein. In any event, the particular plastic cement disclosed in said identified co-pending applications is particularly applicable to the battery construction of the present application, and this cement or its equivalent may be applied to the cell partitions and end plates by coating the cement on a thin vinyl sheet material which is then applied to the battery sides with the cement against the edges of the cell partitions and end plates. In Figure 1, this sheet, by means of which the bonding cement is applied, is designated by numeral 19 and is disclosed as pulled back from the top of the left-hand corner of the battery. While this sheet may be removed from the battery after completion, it is preferably not removed because it adds somewhat to the longitudinal strength of the battery and, further, tends to protect the outer surface of the thermally set plastic cement which is apt to be a bit tacky even after being thermally set. If desired, cellulose acetate which has been coated with the pressure-sensitive adhesive may be used as a flexible sheet material for applying the bonding cement, the pressure-sensitive adhesive in such case supplying the required tack between the cellulose acetate and the bonding cement.

As previously indicated, sheet zinc may be used for the negative electrode if the battery is to be discharged at a low rate, but in any event, we consider it preferable to use a pasted zinc negative. In fabricating such a negative, zinc dust is pasted upon a copper or bronze screen or grid after which it is pressed and sintered to secure adhesion to the screen or grid. Alternatively, a zinc oxide paste may be used on the screen or grid and pressed to adhere to it. In the latter case, the zinc oxide must be electrolytically converted to metallic zinc. This electrolytic forming is also necessary or desirable in the fabrication of the zinc dust electrode if the sintering has not been performed in a neutral or reducing atmosphere. In either case, the plate is formed electrolytically in a 30 per cent caustic solution, such as potassium hydroxide solution, using low current density of the order of .01 to 1.0 ampere per square inch of surface area of the plate. After the forming, the place comprises a mass of spongy zinc of substantially greater active surface area than a sheet of zinc of similar overall dimensions. Alternatively, the negative electrodes may be constituted by electroplating, as disclosed in co-pending application, Serial No. 311,752, filed September 26, 1952, entitled Silver Peroxide Battery and Method of Making.

We have found that zinc negative electrodes are very much improved by being dipped in a 1 per cent mercuric chloride solution which has been made acid by the addition of three drops of hydrochloric acid per liter of solution. Each zinc electrode is exposed to the mercuric chloride solution for approximately three seconds and the treatment provides some degree of amalgamation of mercury with the zinc—enough, in fact, to render the zinc quite brittle. The amalgamation with mercury need not be to the exact degree disclosed.

This amalgamation improves the characteristics of the zinc negative electrodes in two respects. In the first place, the discharge voltage of the cell is increased by 7.7 to 12.2 per cent, that is, from approximately 0.65 volt per cell to approximately 0.73 volt per cell. In the second pace, the zinc negative electrode has far less tendency to polarize when being discharged at a medium or high rate so that a zinc plate having a surface area of substantially one square inch may yield a current continuously which is the order of .06 to .08 ampere at 0.65 to 0.73 volt.

While the cuprous chloride zinc cells may not yield the voltage of the cuprous chloride magnesium cells, due to the fact that zinc is less electronegative than magnesium, and while on a weight basis, the zinc is less efficient than the magnesium, still, by using the spongy cuprous chloride and spongy zinc electrodes on opposite sides of a bibulous electrode for holding electrolyte, a cell is provided which is superior practically to the cuprous chloride magnesium cell for many purposes, due to the circumstance that it operates at a lower temperature and hence does not lose electrolyte by boiling off. Also, the disparity between the two types of cell, in so far as it is unfavorable to the zinc cell, is materially lessened by the amalgamation of zinc with mercury.

On airborne equipment, the combination of the zinc and magnesium cells into a single battery is particularly desirable and effective in that the heat developed during the discharge of the magnesium cells is absorbed by the zinc cells to keep the electrolyte of the zinc cells from freezing at high altitude and to improve the efficiency of the operation of the zinc cells. Also, the avoidance of a series of magnesium cells adjacent to one another, that is, the placing of a magnesium cell between two zinc cells or the disposal of magnesium cells at the ends of the battery avoids the build up of heat to the undesirable degree which results from the operation of a compact group of magnesium cells. Thus, it is readily feasible to construct light, efficient primary batteries for a variety of purposes, which may be operated with a minimum of electrolyte to discharge the active materials of the electrodes fully.

Having described our invention we desire to be limited only by the following claims:

1. A battery adapted to operate over a substantial temperature range, said battery comprising at least two cells connected in series, one cell comprising a pasted cuprous chloride positive electrode and a pasted zinc negative electrode, the other cell comprising a pasted cuprous chloride positive electrode and a magnesium negative electrode, each cell having a bibulous pad for holding electrolyte, said pads disposed between the positive and negative plates of each cell and in engagement with their respective electrodes, said cells being positioned adjacent to each other in the battery whereby a portion of the heat produced upon discharge by the magnesium cell is absorbed by the zinc cell.

2. A battery comprising a series of thin, waferlike cells positioned face to face in respect to one another in a stack and connected in series, all of said cells being constituted by cuprous chloride positive electrodes, negative electrodes and bibulous electrode separators disposed between the electrodes and in engagement with the surface of each for supplying electrolyte to the electrodes, at lease one of said cells having a magnesium negative plate and at least one of said cells having a zinc negative plate.

References Cited in the file of this patent

UNITED STATES PATENTS

| Re. 23,427 | Ruben | Oct. 30, 1951 |
| 2,322,210 | Adams | June 22, 1943 |
| 2,526,692 | Ruben | Oct. 24, 1950 |
| 2,636,060 | Fischbach et al. | Apr. 21, 1953 |
| 2,639,306 | Fischbach | May 19, 1953 |
| 2,640,090 | Pucher et al. | May 26, 1953 |

FOREIGN PATENTS

| 867,151 | France | July 7, 1941 |
| 7,506 | Great Britain | Aug. 3, 1887 |
| 443,983 | Great Britain | Mar. 11, 1936 |